United States Patent
Maiorana et al.

(10) Patent No.: US 7,451,654 B2
(45) Date of Patent: Nov. 18, 2008

(54) CONSTANT POWER DISSIPATION IN CAPACITANCE PRESSURE TRANSDUCERS

(75) Inventors: Philip J. Maiorana, Cambridge, MA (US); Santhi E. Mathew, Londonderry, NH (US)

(73) Assignee: MKS Instruments, Inc., Andover, MA (US)

( * ) Notice: Subject to any disclaimer, the term of this patent is extended or adjusted under 35 U.S.C. 154(b) by 0 days.

(21) Appl. No.: 11/891,167

(22) Filed: Aug. 9, 2007

(65) Prior Publication Data

US 2008/0034879 A1 Feb. 14, 2008

Related U.S. Application Data

(60) Provisional application No. 60/836,567, filed on Aug. 9, 2006.

(51) Int. Cl.
*G01L 9/12* (2006.01)
(52) U.S. Cl. .................. 73/718; 73/724; 361/283.1; 361/15
(58) Field of Classification Search .................. 73/718, 73/724; 361/283.1, 15
See application file for complete search history.

(56) References Cited

U.S. PATENT DOCUMENTS 6,252,759 B1 6/2001 Lange et al.

FOREIGN PATENT DOCUMENTS

| WO | WO9845675 | 10/1998 |
|---|---|---|
| WO | WO9940405 | 8/1999 |

OTHER PUBLICATIONS

International Search Report for corresponding PCT Application No. PCT/US2007/017708, 3pp.
Written Opinion for corresponding PCT Application No. PCT/US2007/017708, 6pp.

*Primary Examiner*—Andre J Allen
(74) *Attorney, Agent, or Firm*—McDermott Will & Emery LLP

(57) ABSTRACT

A system and method are described for maintaining power dissipation substantially constant across the sensor interface board of a capacitance pressure transducer. A shorted diaphragm level detector detects a shorting of the diaphragm onto one or more reference electrodes. A power dissipating resistor is placed near the oscillator that drives the capacitance detecting circuit in the capacitance pressure transducer. The resistor is switched across a power supply when the shorting is detected, causing current to flow through the resistor so that power can be added in an amount sufficient to maintain power dissipation by the oscillator substantially constant when the diaphragm shorts.

20 Claims, 3 Drawing Sheets

CONSTANT POWER DISSIPATION IN CAPACITANCE PRESSURE TRANSDUCERS

BACKGROUND

Capacitance pressure transducers may determine the pressure of gases and vapors by measuring a change in capacitance between a diaphragm and an adjacent electrode.

To ensure that no changes occur in the generation and flow of heat, once the transducer has warmed up, it may be desirable to maintain a constant power dissipation on the sensor interface board. Maintaining power dissipation constant may be especially desirable for low range, high gain pressure transducers.

Attempts may have been made to eliminate or minimize temperature effects at zero pressure, so as to render the transducer insensitive to changes in heat flow at zero pressure, thereby maintaining power dissipation constant. Even if temperature effects are eliminated at zero pressure, however, other pressure points may remain untested and vulnerable to transient shifts.

Attempts may also have been made to add extra thermal isolation between the sensor interface board and the sensor, in order to maintain power dissipation constant. This may tend to compromise, however, other improvements in stability that may be available by temperature controlling the electronics.

Accordingly, there is a need for an improved method and system for controlling power dissipation in a capacitance pressure transducer.

SUMMARY

A system is described for controlling power dissipation in a capacitance pressure transducer having a capacitance detecting circuit configured to detect a change in capacitance between a diaphragm and a reference electrode. The system includes a shorted diaphragm level detector configured to detect a shorting of the diaphragm onto the reference electrode. The system further includes a switch configured to cause a current to be transmitted through a resistor, when the shorting of the diaphragm has been detected, thereby maintaining power dissipation in the transducer substantially constant when the diaphragm shorts.

A system is described for controlling power dissipation in a capacitance pressure transducer that measures pressure by detecting a change in capacitance between a diaphragm and a reference electrode. The system includes a shorting detecting circuit configured to detect a shorting of a diaphragm onto a reference electrode. The system further includes a power dissipation circuit configured to add power to the capacitance pressure transducer, when the shorting of the diaphragm onto the reference electrode has been detected, by sending a current through a resistor connected to an oscillator that drives a capacitance detecting circuit.

A capacitance pressure transducer includes a diaphragm, one or more reference electrodes, and a capacitance detecting circuit configured to detect a change in capacitance between a diaphragm and a reference electrode, the change in capacitance being proportional to a pressure applied to the diaphragm. The transducer further includes an oscillator configured to drive the capacitance detecting circuit, and a shorted diaphragm level detector configured to detect a shorting of the diaphragm onto the reference electrode. The transducer further includes a resistor coupled to the oscillator, and a switch configured to allow a current to be transmitted through the resistor, in response to detection of the shorting of the diaphragm, so as to maintain power dissipation by the transducer substantially constant when the diaphragm shorts.

A method is described of controlling power dissipation in a capacitance pressure transducer configured to measure pressure by detecting a change in capacitance between a diaphragm and a reference electrode. The method includes detecting a shorting of the diaphragm onto the reference electrode. The method further includes adding power dissipation in the transducer by an amount sufficient to compensate for reduction in power dissipation in the transducer caused by the shorting of the diaphragm, thereby maintaining power dissipation in the transducer substantially constant.

DETAILED DESCRIPTION

A method and system are described for maintaining power dissipation substantially constant across the sensor interface board in a capacitance pressure transducer.

Figure 1A:
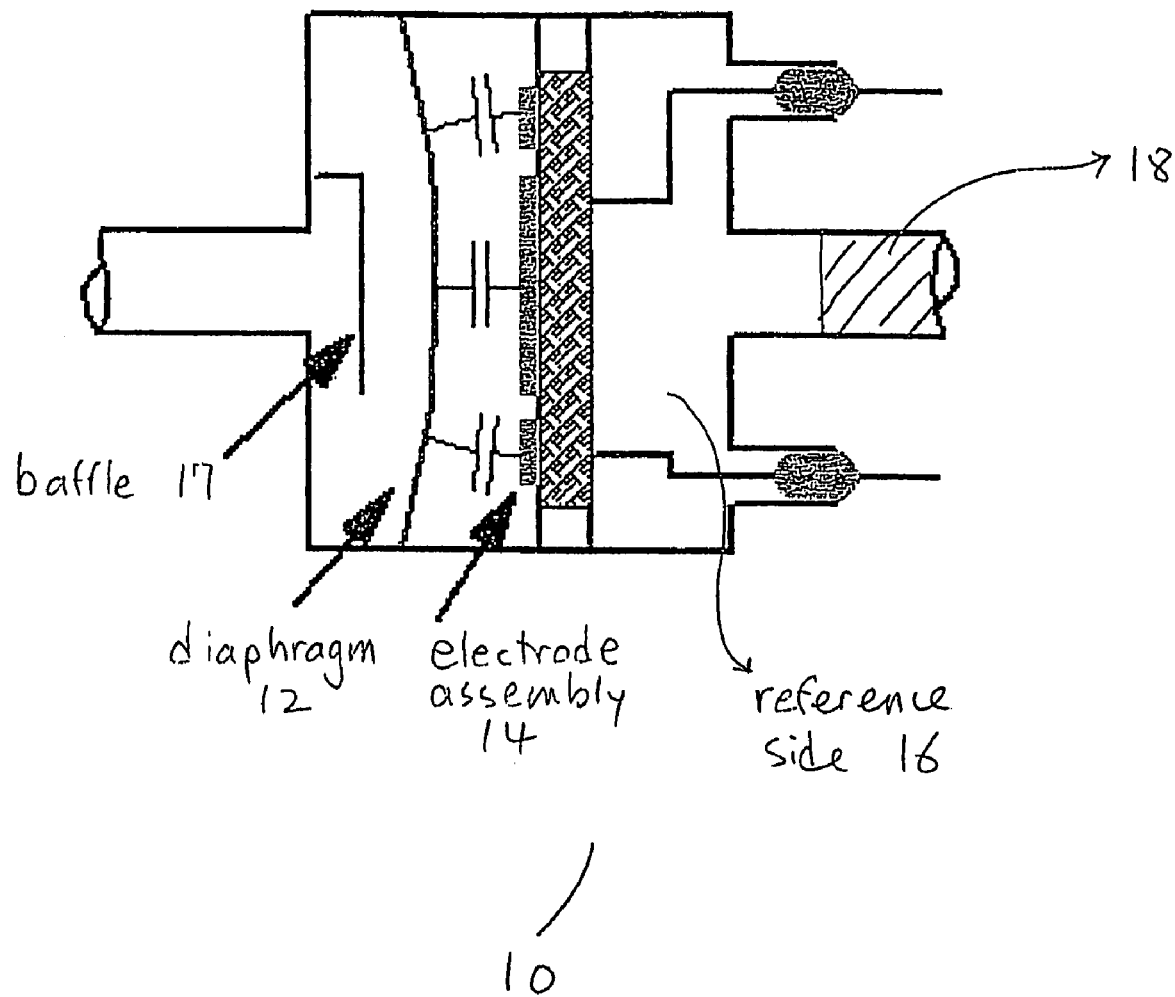
FIG. 1A is a functional block diagram of one example of a capacitance pressure transducer.

FIG. 1A is a functional block diagram of one example of a capacitance pressure transducer 10. The capacitance pressure transducer 10 includes a diaphragm 12, and an assembly of electrodes 14. The diaphragm 12 may be a metal diaphragm 12, and the capacitive electrodes 14 may be rigidly attached to the back or reference side 16 of the metal diaphragm 12. A baffle 17 may be provided to stop intrusion of undesirable particles or energy.

The capacitance pressure transducer 10 is configured to deliver an output signal that is proportional to the pressure being measured. When pressure is applied to the diaphragm 12, its deflection produces a change in the distance between the electrodes and the diaphragm, thereby causing a resultant capacitance change. As shown in more detail in conjunction with FIG. 1B, the change in capacitance caused by the applied pressure may be converted into an AC voltage by a capacitance bridge circuit and preamplifier, which are excited by an oscillator. This AC signal may then be amplified and synchronously demodulated, resulting in a very stable DC output (between about 0 Volts and 10 Volts) that is directly proportional to pressure. This output signal may be read directly by a data acquisition system, a readout or power supply instrument, or a controller, for accurate pressure control.

The capacitance pressure transducer 10 may be a stand-alone transducer that requires about a ±15 volt power supply. The capacitance pressure transducer 10 may measure pressure defined as force/unit area. The pressure measurement by the capacitance pressure transducer 10 may be insensitive to the type of gas being measured. The electrode assembly 14 may have a metal-on-ceramic electrode structure. The reference side (or backside) 16 of the transducer 10 may be maintained at a very high vacuum over the life of the manometer, by means of an internal chemical getter pump 18. The diaphragm 12 may be a radially tensioned diaphragm designed to provide very low hysteresis, high repeatability, high resolution and fast response.

Figure 1B:
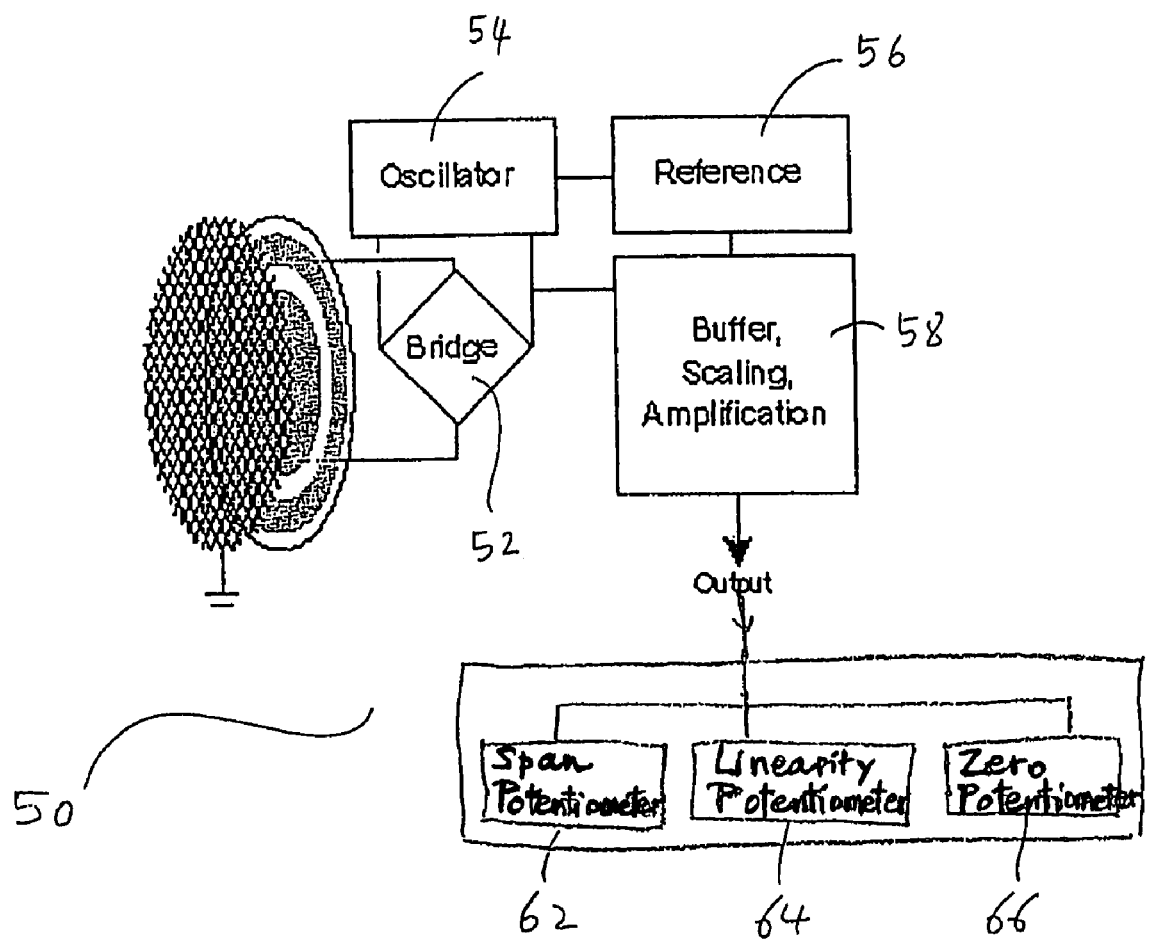
FIG. 1B is a block diagram illustrating electronic circuitry for the capacitance pressure transducer shown in FIG. 1B.

FIG. 1B is a block diagram illustrating electronic circuitry 50 for the capacitance pressure transducer 10 shown in FIG. 1A. The electronic circuitry 50 may be located adjacent to the sensor, for example on a sensor interface board. The electronic circuitry 50 may include the following components: a capacitance detecting circuit 52; an oscillator 54; a reference 56; and a buffer, scaling, and amplification circuit 58. The capacitance detecting circuit 52 detects the change in capacitance between the diaphragm 12 and the electrodes 14 shown in FIG. 1A. The capacitance detecting circuit 52 may be a conventional diode bridge circuit, including a plurality of diode elements arranged in a bridge configuration, and one or more coupling capacitors.

The oscillator 54 is configured to drive the bridge circuit, and may be a precision constant frequency oscillator. The reference 56 is configured to provide a reference level from which an imbalance in the transducer electrode capacitance can be measured. The imbalance in the sensor electrode capacitance produces a difference output, which may be amplified by a buffer, scaling, and amplification circuit 58. The offset, gain, and linearity of the resulting output signal may be adjusted by a zero potentiometer 66, a span potentiometer 62, and a linearity potentiometer 64, respectively. These adjustments may ensure a proper correspondence between pressure input and voltage output.

It is desirable to maintain a constant power dissipation on the sensor interface board that contains the sensor electronic circuitry shown in FIG. 1B. In this way, no changes would occur in the generation and flow of heat, once the transducer 10 has warmed up. In the past, failure to maintain a constant power dissipation may have been most conspicuous in low range and high gain pressure transducers. The requirement to maintain power dissipation constant may be especially important for unheated transducers, but has been shown to be important for heated units as well.

Figure 2:
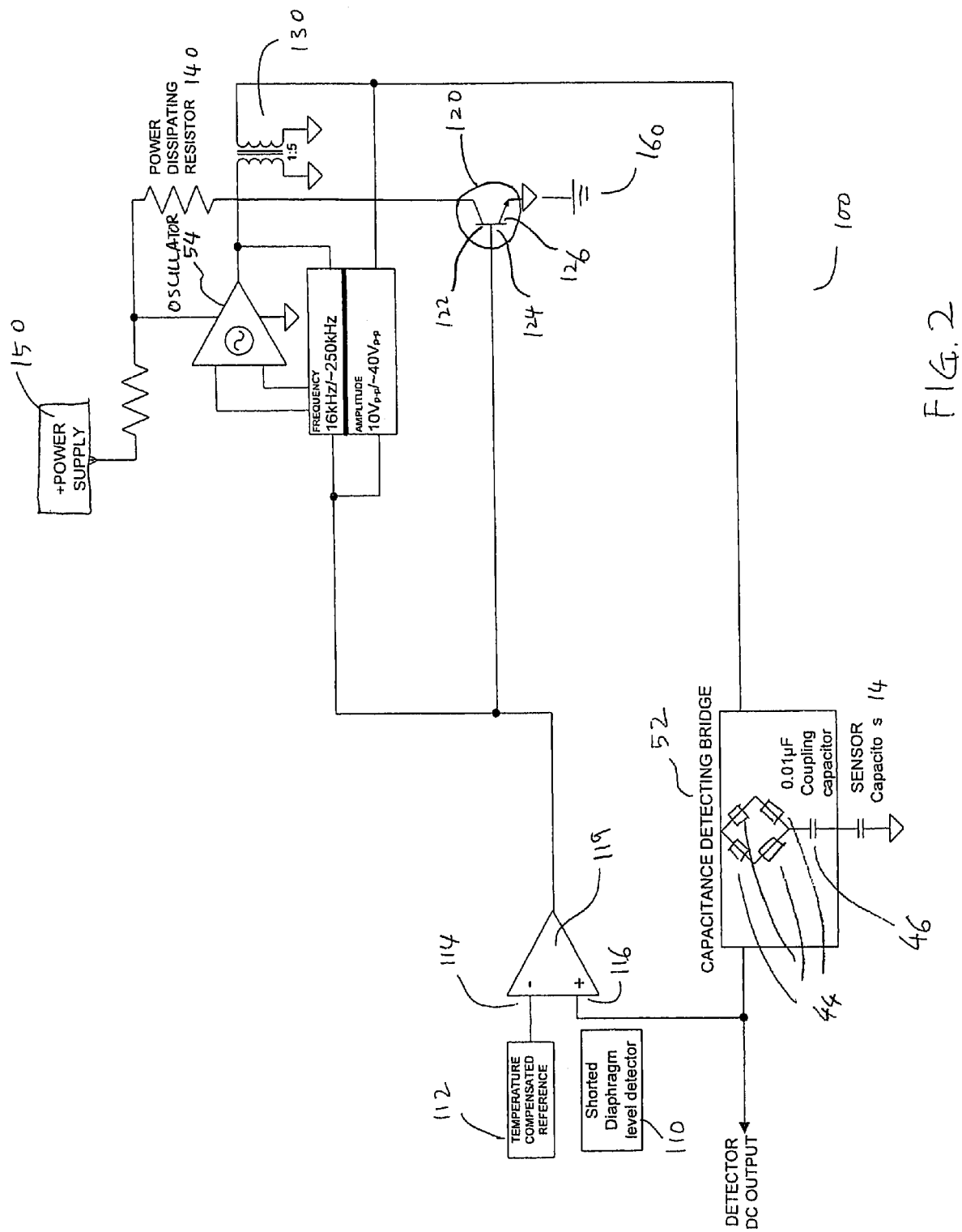
FIG. 2 is a circuit diagram of a system for controlling power dissipation in the capacitance pressure transducer illustrated in FIGS. 1A and 1B.

FIG. 2 is a block diagram of one embodiment of a system 100 for controlling power dissipation in a capacitance pressure transducer. In overview, the system 100 includes: a shorted diaphragm level detector 110; a power dissipating resistor 140 located near the oscillator drive amplifier 54 and connectable between a power supply 150 and a ground 160; a step-up transformer 130; and a transistor switch 120.

The system 100 is configured to switch the power dissipating resistor 140 (located near the oscillator drive amplifier 54) across the power supply 150, when it is necessary to add power to the sensor interface board because the diaphragm 12 shorts onto the electrodes 14. The shorting of the diaphragm 12 onto the electrodes 14 results in a much higher capacitive load of the transducer 10. In particular, the system 100 is configured to: 1) detect a shorting of the diaphragm 12 onto the electrodes 14; and 2) when the shorting condition has been detected, connect the resistor 140 between a V+ power supply 150 to the ground 160, so as to compensate for reduced power dissipation in the oscillator 54.

When an excitation oscillator operates into a typical capacitance range of the capacitance pressure transducer 10, substantially less power is dissipated in the oscillator driver amplifier, as compared to when the diaphragm shorts, at which time the circuit switches to a lower peak-to-peak voltage and oscillator frequency. For example, when a 40 $V_{p-p}$ (peak-to-peak), 250 $kH_z$ excitation oscillator operates into a typical 120 pF capacitance range of a 100 mT transducer, about twice as much power may be dissipated in the oscillator driver amplifier when the diaphragm shorts, at which time the circuit with the step-up transformer 140 may switch to 10 $V_{p-p}$ at 16 $kH_z$. This change in voltage and frequency results in the total power dissipated in the system being about ½ the normal power (diaphragm not shorted). The system 100 is configured to detect, through logic, the shorting of the diaphragm onto the electrodes, and to apply a base drive to the transistor 120 so as to connect the resistor 140 from the V+ power supply 150 to the ground 160. The resistor 140 is selected to make up the additional power needed to maintain power dissipation substantially constant.

The system 100 includes a step-up transformer 130 for optimizing oscillator excitation. As known, maximizing oscillator amplitude directly improves the signal-to-noise ratio of a capacitance based pressure transducer, whose output is directly proportional to the oscillator excitation amplitude. It is desirable that this maximization be done with maximum efficiency and minimum power dissipation, for all conditions that occur in the diode bridge circuit 52.

To achieve a maximum available oscillator amplitude, some conventional systems may maximize power supply voltage. Maximizing power supply voltage may, however, prevent the use of more modern parts that operate at lower voltages and are thus more reliable. These conventional systems may not give regard to power dissipation, either during normal operation or in the event of a sensor shorting condition.

In the illustrated embodiment, the step-up transformer 130 may be a simple 5:1 auto-transformer, which may be designed for the high excitation frequency of 250 kHz. The size and inductance of the transformer 130 may be kept small. The transformer may be a simple toroid that can be manufactured at low cost in a single machine operation, providing a large benefit for the cost.

With a 5:1 step-up ratio and in auto-transformer mode, a low voltage operational amplifier may be used to generate an optimally high excitation voltage. The oscillator drive amplifier 54 needs a high output current capability, as may be common in video amplifiers. In the illustrated embodiment, the oscillator 54 may be a 40 $V_{p-p}$ at 250 kHz oscillator used to excite low range (<1 Torr) capacitance manometers. In other words, the oscillator 54 is configured to drive the bridge circuit at a peak-to-peak voltage of about 40 volts and a driving frequency of about 250 kHz during normal operation. The other oscillator amplitude, 10 $V_{p-p}$, may used for all other transducer ranges, and the amplitude may be set digitally depending upon the range.

The secondary inductance of the transformer 130 is optimized to resonate into the capacitive load of the operating capacitance transducer. A second resonant point is measured when the diaphragm shorts and the larger coupling capacitors form the load.

In the illustrated circuit configuration, the 40$V_{p-p}$, 250 kHz oscillator signal comes from the secondary side of the transformer 130. Therefore, the oscillator amplifier 54 has to drive 8 volts p-p (i.e., 40 volts divided by 5) into the primary of the transformer 130, with 5 times more current that would be driven through the bridge impedance and the transducer 10. If the transducer 10 has about 60-65 pF per sensor capacitor 14, then the oscillator 54 sees about 130 pF. At 250 kHz, this represents an impedance of about 5000 ohms. The 40 $V_{p-p}$ oscillator 54 will thus have to deliver 20 volts peak into about 5000 ohms, i.e. about 4 milliamps. The oscillator circuit must then provide 5×4=20 mA into the primary, at +/−4V. This can be readily performed by commercially available low voltage, high efficiency op-amps, and the bridge circuit 52 can be provided with a high voltage drive signal, as desired.

With the high output current capability described above, the occurrence of diaphragm shorting must be actively resolved to further limit power dissipation. In the illustrated embodiment, a shorting condition is detected by a saturated bridge output in order to switch in a network to reduce the oscillator frequency to its "shorted" resonant point of about 16 kHz. Additionally, if the oscillator was at 40$V_{p-p}$, its amplitude is reduced to the 10 $V_{p-p}$ level in discrete logic, or under the control of the CPU (not shown). Power dissipation is cut in half under this condition for low range (<1 Torr) transducers and remains approximately the same for all other ranges.

The shorted diaphragm level detector 110 may be a shorting detector circuit configured to detect a shorting of the diaphragm 12 onto the electrodes 14. In the illustrated embodiment, the shorted diaphragm level detector 110 is a voltage comparator having a first input 114 coupled to a temperature compensated reference, and a second input 116 coupled to the output of the capacitance detecting circuit 52.

The voltage comparator 119 is configured to switch to high, when shorting of the diaphragm onto the reference electrode causes the capacitance bridge circuit 52 to saturate. The capacitance detecting circuit 52 includes a plurality of diode components 44 arranged in a bridge configuration, and at least one coupling capacitor 46. When one or both electrodes 14 of the capacitance transducer 10 short, the coupling capacitors 46 dramatically change the capacitance seen on the bridge circuit 52, typically by more than 100 times. This results in the saturation of the bridge diode components 44. This type of saturation only occurs during a shorted condition. The temperature compensated reference 112 in the shorting detector circuit 110 establishes a voltage on the comparator 119 that is indicative of the saturation. In this way, the comparator 119 switches to high when the shorting condition is met. The temperature compensated reference 112 adjusts for the fact that bridge saturation is very temperature dependent.

Once shorting is detected, even reducing the oscillator amplitude with a ×100 larger capacitance will keep the bridge 52 saturated. But by reducing the amplitude of the oscillator 54 to 10V p-p, and switching the frequency to the new resonant point of 16 kHz, the power delivered by the oscillator circuit into the primary of the transformer 130 is reduced to approximately ½ of the normal operation value.

The switch 120 connects the power resistor 140 to ground, so that the resistor dissipates the other half of the normal power. In this way the entire circuit block, including the oscillator driver 54 and the power resistor 140, ends up dissipating the same power as under normal conditions, so that the temperature on the circuit board does not change.

With the 10 $V_{p-p}$ excitation oscillator used for 1 Torr sensors and above, the above-described switch from 250 kHz at normal operation to 16 kHz when the diaphragm shorts keeps the power dissipation in the oscillator driver amplifier 54 the same, since the oscillator is able to maintain the proper oscillator amplitude. One advantage is that all the circuits are operating under their normal levels, in spite of the shorted sensor.

In the illustrated embodiment, the switch 120 is a transistor, although other embodiments may use other types of switches. The transistor 120 has a base terminal 124 coupled to the voltage comparator 119, a collector terminal 122 coupled to the resistor 130, and an emitter terminal 126 coupled to the ground 160. As known, a small current or voltage applied to the base 124 allows a larger current or voltage to flow through the other two leads, i.e. from the collector 122 to the emitter 126. The transistor 120 is configured to allow a current to flow from the emitter terminal 126 to the collector terminal 122 and through the resistor 130, when a drive signal is applied to the base terminal 124 upon detection by the shorting detecting circuit of the shorting of the diaphragm.

In sum, a system and method have been described for maintaining power dissipation substantially constant across the sensor interface board of a capacitance pressure transducer, when the diaphragm shorts onto the electrodes, by detecting the shorting of the diaphragm and switching a power resistor across the power supply to add power to the sensor interface board.

The system and method described above allows for compensation of thermal gradients on the sensor interface board, thereby substantially eliminating, thermal transient behavior. The total power may be minimized on the sensor interface board, thereby keeping the temperature rise of the transducer components at a minimum, and improving reliability. Also, the lack of changes to the thermal package allows for better control of the transducer temperature environment. Further, the use of the step-up transformer results in a significantly improved signal-to-noise ratio, as a direct result of higher excitation gain for low range (or high gain) transducers. Using the step-up transformer also limits power dissipation in the oscillator circuitry, thereby improving thermal behavior of the transducer.

While certain embodiments have been described of a system and method for maintaining power dissipation constant, it is to be understood that the concepts implicit in these embodiments may be used in other embodiments as well. The protection of this application is limited solely to the claims that now follow.

In these claims, reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference, and are intended to be encompassed by the claims. Moreover, nothing disclosed herein is intended to be dedicated to the public, regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A system for controlling power dissipation in a capacitance pressure transducer having a capacitance detecting circuit configured to detect a change in capacitance between a diaphragm and a reference electrode, the system comprising:
   a shorted diaphragm level detector configured to detect a shorting of the diaphragm onto the reference electrode; and
   a switch configured to cause a current to be transmitted through a resistor, when the shorting of the diaphragm has been detected, thereby maintaining power dissipation in the transducer substantially constant when the diaphragm shorts.

2. A system according to claim 1, wherein the resistor has a resistivity sufficient to compensate for a reduction in power dissipation in the pressure transducer that occurs as a result of shorting of the diaphragm.

3. A system according to claim 1,
   wherein the shorted diaphragm level detector comprises a voltage comparator and a temperature compensated reference.

4. A system according to claim 3,
   further comprising a power supply configured to supply power to the oscillator; and
   wherein the switch is responsive to detection of the shorting of the diaphragm to connect the resistor between the power supply and a ground, so as to transmit the current through the resistor.

5. A system according to claim 3,
wherein the capacitance detecting circuit comprises a capacitance bridge circuit; and
wherein the voltage comparator is configured to switch to high, when shorting of the diaphragm onto the reference electrode causes the capacitance bridge circuit to saturate.

6. A system according to claim 4,
wherein the voltage comparator has a first input, a second input, and an output; and
wherein the first input of the voltage comparator is coupled to the temperature compensated reference, the second input of the voltage comparator is coupled to an output of the capacitance detecting circuit, and the output of the voltage comparator is coupled to the base terminal of the transistor.

7. A system according to claim 5,
wherein the capacitance bridge circuit comprises a plurality of diode elements arranged in a bridge configuration, and one or more coupling capacitors; and
wherein the coupling capacitors are configured to increase value of capacitance detected by the bridge circuit by a factor of about 100, upon shorting of the diaphragm onto the reference electrode.

8. A system according to claim 1, further comprising a step-up transformer coupled between the oscillator and the capacitance bridge circuit.

9. A system according to claim 8,
wherein the step-up transformer has a step-up ratio of about 5:1; and
wherein a secondary inductance of the step-up transformer has a first resonant point that resonates into a first capacitive load of the capacitance transducer, and a second resonant point that resonates into a second capacitive load of the capacitance transducer.

10. A system according to claim 9,
wherein the first capacitive load comprises a capacitive load of the capacitance transducer at a time point in which the diaphragm has not shorted onto the reference electrode; and
wherein the second capacitive load comprises a capacitive load of the transducer at a time point in which the diaphragm has shorted onto the reference electrode.

11. The system of claim 1,
wherein an output of the shorted diaphragm level detector is proportional to an excitation amplitude of the oscillator; and
wherein the oscillator is configured to drive the capacitance bridge circuit at a peak-to-peak voltage of about 40 Volts and a driving frequency of about 250 kHz, when the diaphragm has not shorted onto the reference electrode.

12. The system of claim 1,
wherein the oscillator is further configured to drive the capacitance bridge circuit at a peak-to-peak voltage of about 10 Volts and a driving frequency of about 16 kHz, when the diaphragm has shorted onto the reference electrode.

13. A system for controlling power dissipation in a capacitance pressure transducer that measures pressure by detecting a change in capacitance between a diaphragm and a reference electrode, the system comprising:
a detecting circuit configured to detect a shorting of a diaphragm onto a reference electrode; and
a power dissipation circuit configured to add power to the capacitance pressure transducer, when the shorting of the diaphragm onto the reference electrode has been detected, by sending a current through a resistor connected to an oscillator that drives a capacitance bridge circuit that detects the change in capacitance between the diaphragm and the reference electrode.

14. A system according to claim 13,
wherein the detecting circuit comprises a voltage comparator and a temperature compensated reference, the voltage comparator configured to switch to high when shorting of the diaphragm onto the reference electrode causes the capacitance bridge circuit to saturate.

15. A system according to claim 14,
wherein the power dissipation circuit comprises a resistor coupled to an oscillator configured to drive the capacitance detecting circuit, and a switch configured to cause a current to be transmitted through the resistor when the shorting of the diaphragm has been detected, thereby maintaining power dissipation in the transducer substantially constant when the diaphragm shorts.

16. A capacitance pressure transducer, comprising:
a diaphragm;
one or more reference electrodes;
a capacitance detecting circuit configured to detect a change in capacitance between a diaphragm and a reference electrode, the change in capacitance being proportional to pressure applied to the diaphragm;
an oscillator configured to drive the capacitance detecting circuit;
a shorted diaphragm level detector configured to detect a shorting of the diaphragm onto the reference electrode;
a resistor coupled to the oscillator; and
a switch configured to allow a current to be transmitted through the resistor, in response to detection of the shorting of the diaphragm, so as to maintain power dissipation by the transducer substantially constant when the diaphragm shorts.

17. The capacitance pressure transducer of claim 16, further comprising a step-up transformer coupled between the oscillator and the capacitance bridge circuit.

18. A method of controlling power dissipation in a capacitance pressure transducer configured to measure pressure by detecting a change in capacitance between a diaphragm and a reference electrode, the method comprising:
detecting a shorting of the diaphragm onto the reference electrode; and
adding power dissipation in the transducer by an amount sufficient to compensate for reduction in power dissipation in the transducer caused by the shorting of the diaphragm, thereby maintaining power dissipation in the transducer substantially constant.

19. The method of claim 18, wherein the act of adding power to the transducer comprises transmitting a current through a resistor that coupled to an oscillator adapted to drive a capacitance detecting circuit that detects the change in capacitance between the diaphragm and the reference electrode.

20. A method according to claim 19, wherein the act of transmitting the current through the resistor comprises:
applying a drive signal to a base terminal of a transistor so as to allow a current to flow from the emitter terminal of the transistor to the collector terminal of the transistor and through the resistor, thereby dissipating power in an amount sufficient as the current flows through the resistor.

* * * * *